United States Patent
Ahn

(10) Patent No.: US 7,190,812 B2
(45) Date of Patent: Mar. 13, 2007

(54) METHOD OF CALCULATING SUB-PIXEL MOVEMENT AND POSITION TRACKING SENSOR USING THE SAME

(75) Inventor: Jung-Hong Ahn, Yongin (KR)

(73) Assignee: Atlab Inc. (KR)

( * ) Notice: Subject to any disclaimer, the term of this patent is extended or adjusted under 35 U.S.C. 154(b) by 115 days.

(21) Appl. No.: 10/975,942

(22) Filed: Oct. 28, 2004

(65) Prior Publication Data

US 2005/0162393 A1 Jul. 28, 2005

(30) Foreign Application Priority Data

Oct. 29, 2003 (KR) ............... 10-2003-0076093

(51) Int. Cl.
*G06K 9/00* (2006.01)
(52) U.S. Cl. .................. 382/107; 382/103; 345/166
(58) Field of Classification Search ............. 382/103, 382/107; 345/166
See application file for complete search history.

(56) References Cited

U.S. PATENT DOCUMENTS 5,586,202 A * 12/1996 Ohki et al. .............. 382/236
6,664,948 B2 * 12/2003 Crane et al. ............. 345/166

FOREIGN PATENT DOCUMENTS

EP        1283492       2/2003

OTHER PUBLICATIONS

English Abstract from communication from Taiwan Patent Office dated Oct. 13, 2006.

* cited by examiner

*Primary Examiner*—Bhavesh M. Mehta
*Assistant Examiner*—Christopher Lavin
(74) *Attorney, Agent, or Firm*—Cantor Colburn LLP

(57) ABSTRACT

The present invention discloses a method of calculating sub-pixel movement and a position tracking sensor using the same. The method includes: setting a reference frame and receiving a current surface image illuminated by light as a sample frame; calculating correlation between the reference frame and the sample frame to obtain a movement value; when the calculated movement value is above a first value, updating the reference frame to the sample frame, and when above a second value, recognizing a movement value of the sample frame with respect to the reference frame; and calculating the movement value of the sample frame with respect to an auxiliary reference frame, and updating the auxiliary reference frame to the sample frame in association with the movement calculation of the sample frame to the reference frame, and when the calculated movement value is above a third value, recognizing the movement value of the sample frame with respect to the auxiliary reference frame. Therefore, by adding and using the auxiliary reference frame separately from the reference frame, resolution to the movement of the optical mouse is enhanced and performance of the optical mouse using the same is significantly improved.

9 Claims, 5 Drawing Sheets

METHOD OF CALCULATING SUB-PIXEL MOVEMENT AND POSITION TRACKING SENSOR USING THE SAME

CROSS-REFERENCE TO RELATED APPLICATION

This application claims the benefit of Korean Patent Application No. 2003-76093, filed Oct. 29, 2003, the disclosure of which is hereby incorporated herein by reference in its entirety.

BACKGROUND OF THE INVENTION

1. Field of the Invention

The present invention relates to an optical mouse and, more particularly, to a method of calculating sub-pixel movement and a position tracking sensor using the same in which resolution to the movement of an optical mouse can be enhanced when the optical mouse moves precisely.

2. Description of the Related Art

In general, as shown in FIG. 1, an optical mouse includes a light source 1 that generates and emits light 2; a lens 4 that gathers reflected light when the light 2 emitted from the light source 1 is reflected from a surface 3 of a worktable, and a position tracking sensor 6 that detects movement from an image change of the surface illuminated by light 5 incident through the lens 4 and calculates a movement value.

With this configuration, the position tracking sensor 6 extracts and stores a surface image at a very high speed. Each image extracted and stored in this way is referred to as a "frame." The position tracking sensor 6 calculates correlation between the stored frames to recognize the movement of the optical mouse and outputs a value corresponding to the movement.

FIG. 2 is a diagram illustrating a frame configuration method of the position tracking sensor shown in FIG. 1 and a method of calculating sub-pixel movement using the same.

As shown in FIG. 2, the position tracking sensor requires a reference frame and a sample frame to calculate the movement value of the optical mouse.

Here, the sample frame is a current image extracted and stored by the position tracking sensor, and the reference frame is one that the previous sample frame is stored.

Thus, the position tracking sensor sets a reference area in a single entire frame selected and stored as the reference frame, and calculates correlation between the currently inputted sample frame and the reference area while scanning every pixel by a pixel unit in a zigzag direction from an upper left end to a lower right end of the sample frame, and finds the location of the sample frame whose correlation is the highest to calculate a moving direction and a moving distance.

When the highest correlation is found by comparing the sample frame with the reference frame, if the sample frame moves from at least 0.5 pixel to at most 1.5 pixels with respect to the reference frame, it is calculated that the sample frame moves by one pixel, and if the sample frame moves more than a preset value with respect to the reference frame, the reference frame is updated to the current sample frame, and then the updated reference frame is used as the reference frame when the next sampling is carried out.

The following Table 1 represents the number of times recognizing movement of the optical mouse according to operation of the position tracking sensor of FIG. 2.

TABLE 1

| | Sampling No. | | | | | | | | |
|---|---|---|---|---|---|---|---|---|---|
| | N | N+1 | N+2 | N+3 | N+4 | N+5 | N+6 | N+7 | N+8 |
| Actual moving distance (pixel unit) | 0.0 | 0.4 | 0.8 | 1.2 | 1.6 | 2.0 | 2.4 | 2.8 | 3.2 |
| Update of reference frame | Yes | — | — | — | — | — | — | — | — |
| Distance between reference frame and sample frame | 0.0 | 0.4 | 0.8 | 1.2 | 1.6 | 2.0 | 2.4 | 2.8 | 3.2 |
| Recognition of movement of sample frame with respect to reference frame? | — | — | Yes | — | Yes | — | — | Yes | — |
| Number of times recognizing movement of sample frame with respect to reference frame | 0 | 0 | 1 | 1 | 2 | 2 | 2 | 3 | 3 |

As shown in Table 1, the movement of the sample frame with respect to the reference frame of the position tracking sensor is first recognized when the sample frame moves at a distance of at least about 0.5 pixel at the time when the reference frame is updated, and then is additionally recognized whenever the moving distance is increased by about 1.0 pixel.

In other words, when the number of the reference frame is one (1), the position tracking sensor recognizes the movement of the optical mouse, whenever the moving distance is increased from about 0.5 pixel to about 1.5 pixels, from about 1.5 pixels to about 2.5 pixels, etc.

Therefore, the optical mouse having one reference frame recognizes the movement at the time point of N+2 when the actual moving distance amounts to 0.8 pixel, and further recognizes the movement at the time point of N+4 when the actual moving distance amounts to 1.6 pixels.

However, in the above-mentioned method of calculating sub-pixel movement of the position tracking sensor, the movement is recognized by 0.5 pixel unit, only when the movement of the optical mouse is first recognized after the position tracking sensor updates the reference frame, and then the movement of the optical mouse is not additionally recognized until the optical mouse moves above one pixel.

Therefore, the position tracking sensor cannot recognize the movement of below 1.0 pixel, i.e. sub-pixel, so that it has a problem that resolution is degraded.

SUMMARY OF THE INVENTION

It is, therefore, an object of the present invention to provide a method of calculating sub-pixel movement and a position tracking sensor using the same in which an auxiliary reference frame is added, and the sub-pixel movement can be continuously recognized using the added auxiliary reference frame.

According to an aspect of the present invention, there is provided a method of calculating sub-pixel movement through a position tracking sensor comprising: setting a reference frame and receiving a current surface image illuminated by light as a sample frame; calculating correlation between the reference frame and the sample frame to obtain a movement value; when the calculated movement value is above a first value, updating the reference frame to the sample frame, and when above a second value, recognizing a movement value of the sample frame with respect to the reference frame; and calculating the movement value of the sample frame with respect to an auxiliary reference frame, and updating the auxiliary reference frame to the sample frame in association with the movement calculation of the sample frame to the reference frame, and when the calculated movement value is above a third value, recognizing the movement value of the sample frame with respect to the auxiliary reference frame.

The position tracking sensor of the present invention detects movement through image change of a surface illuminated by light, wherein the position tracking sensor has a reference frame and an auxiliary reference frame, and when a sample frame is input, independently calculates and outputs a movement value of the sample frame with respect to the reference frame and a movement value of the sample frame with respect to the auxiliary reference frame.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

A method of calculating sub-pixel movement and a position tracking sensor using the same in accordance with the present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like numbers refer to like elements throughout the specification.

Figure 1:
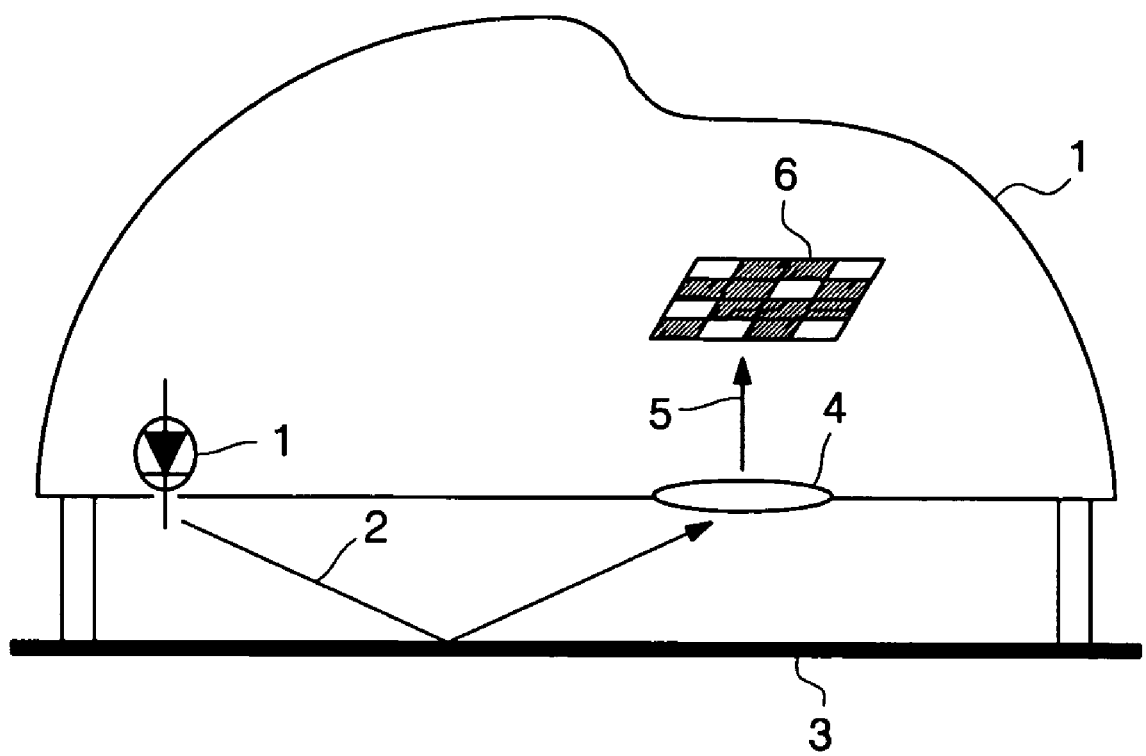
FIG. 1 is a block diagram illustrating a configuration of a general optical mouse.
Figure 2:
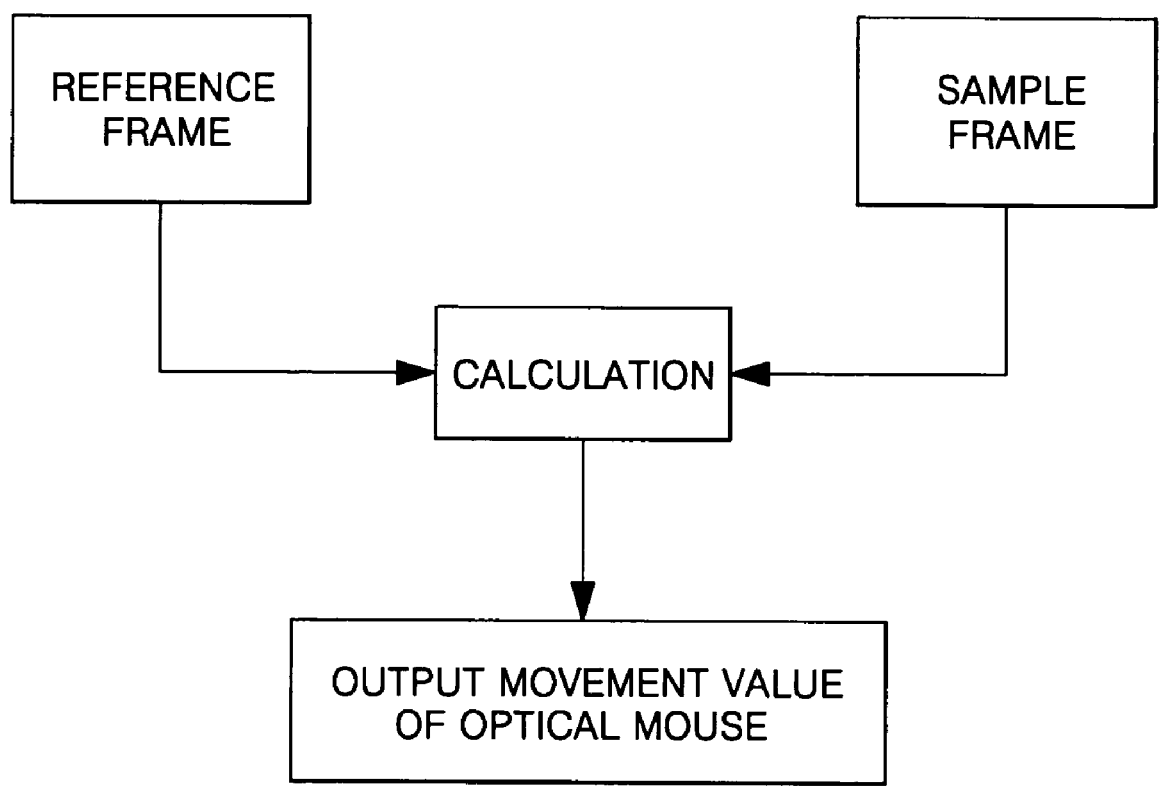
FIG. 2 is a diagram illustrating a method of configuring frames of a position tracking sensor shown in FIG. 1 and a method of calculating sub-pixel movement using the same.
Figure 3A:
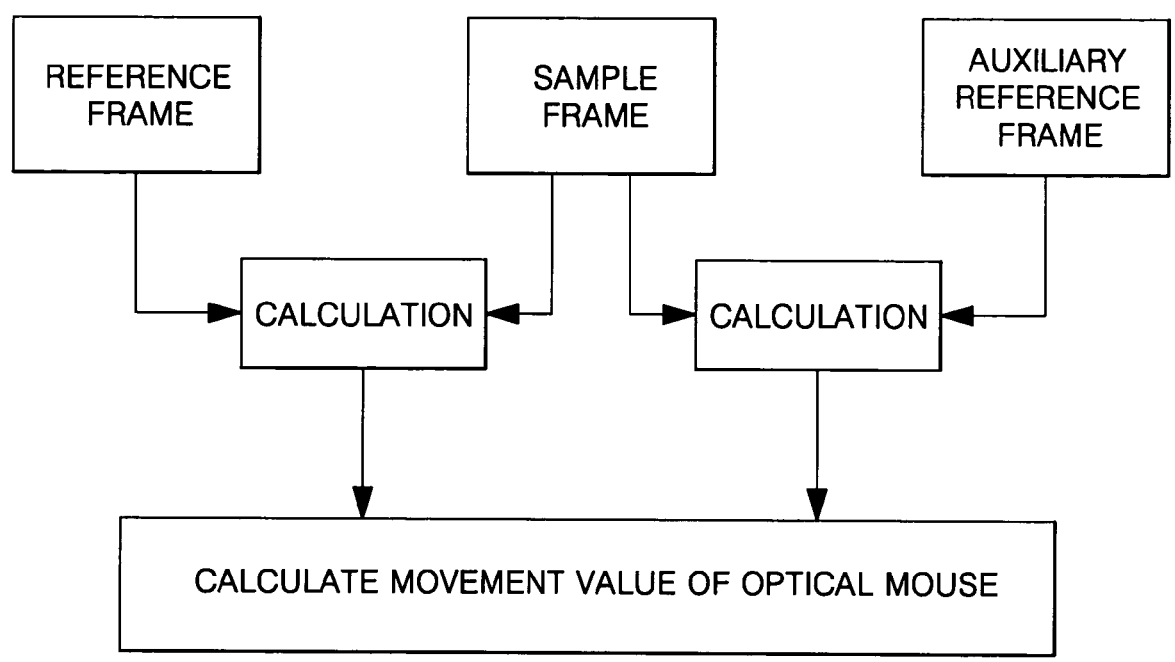
FIGS. 3a and 3b are diagrams illustrating a method of configuring frames of a position tracking sensor and a method of calculating sub-pixel movement in accordance with an embodiment of the present invention.
Figure 3B:
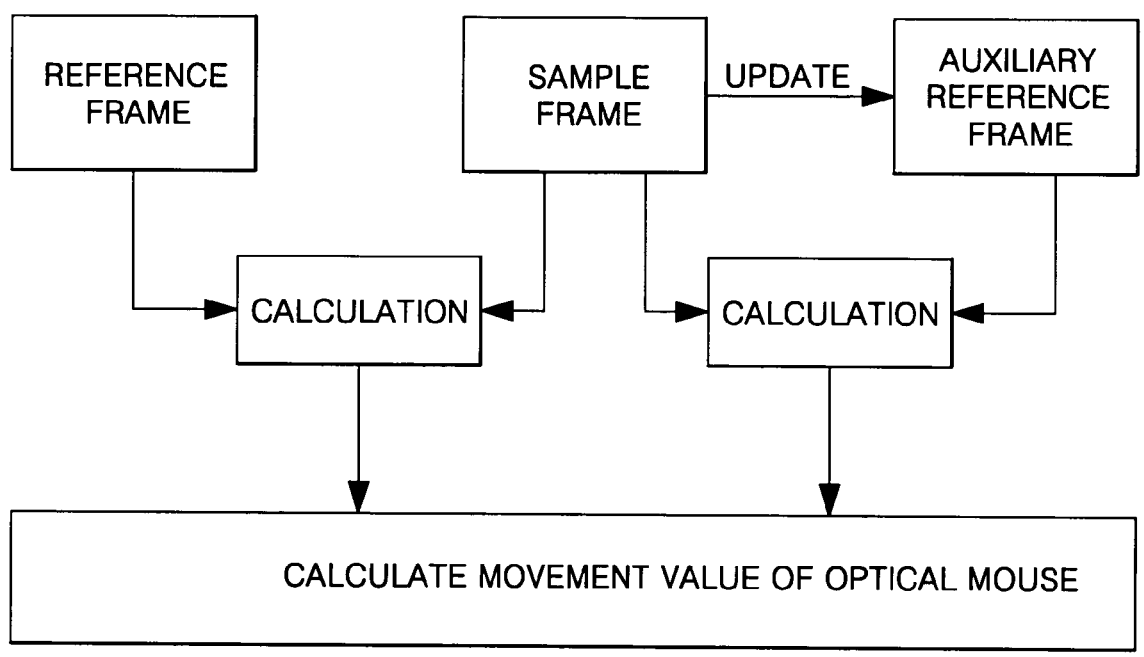

FIGS. 3a and 3b are diagrams illustrating a method of configuring frames of a position tracking sensor and a method of calculating sub-pixel movement using the same in accordance with an embodiment of the present invention.

Referring to FIGS. 3a and 3b, the position tracking sensor of the present invention can calculate movement using a reference frame and an additional auxiliary reference frame.

Here, the auxiliary reference frame has the same configuration as a reference frame of a conventional position tracking sensor. Further, a method calculating sub-pixel movement of the sample frame with respect to the auxiliary reference frame is equal to the method calculating pixel movement calculation of the sample frame with respect to a conventional reference frame.

However, the auxiliary reference frame has an updating time different from that of the reference frame, and generally, the auxiliary reference frame is more frequently updated than the reference frame.

Here, in the auxiliary reference frame, the movement value of the sample frame is calculated using a value different from that of the reference frame, so that the movement calculation of the reference frame is compensated to find the sub-pixel movement.

Further, the method of calculating the sub-pixel movement through the position tracking sensor in accordance with the present invention can be divided into a case where the auxiliary reference frame is updated and a case where the auxiliary reference frame is not updated.

FIG. 3a is a schematic diagram illustrating a concept of a method of calculating sub-pixel movement through a position tracking sensor where an auxiliary reference frame is not updated, and FIG. 3b is a schematic diagram illustrating a concept of a method of calculating sub-pixel movement through a position tracking sensor where an auxiliary reference frame is updated.

In FIG. 3a, the movement calculation of the position tracking sensor determines the movement value of the optical mouse using both a movement value calculated between the reference frame and the sample frame and another movement value calculated between the auxiliary reference frame and the sample frame.

In FIG. 3b, the movement calculation of the position tracking sensor determines the movement value of the optical mouse using both a movement value calculated between the reference frame and the sample frame and another movement value calculated between the auxiliary reference frame and the sample frame, wherein the auxiliary reference frame is updated by the currently inputted value of the sample frame.

Figure 4:
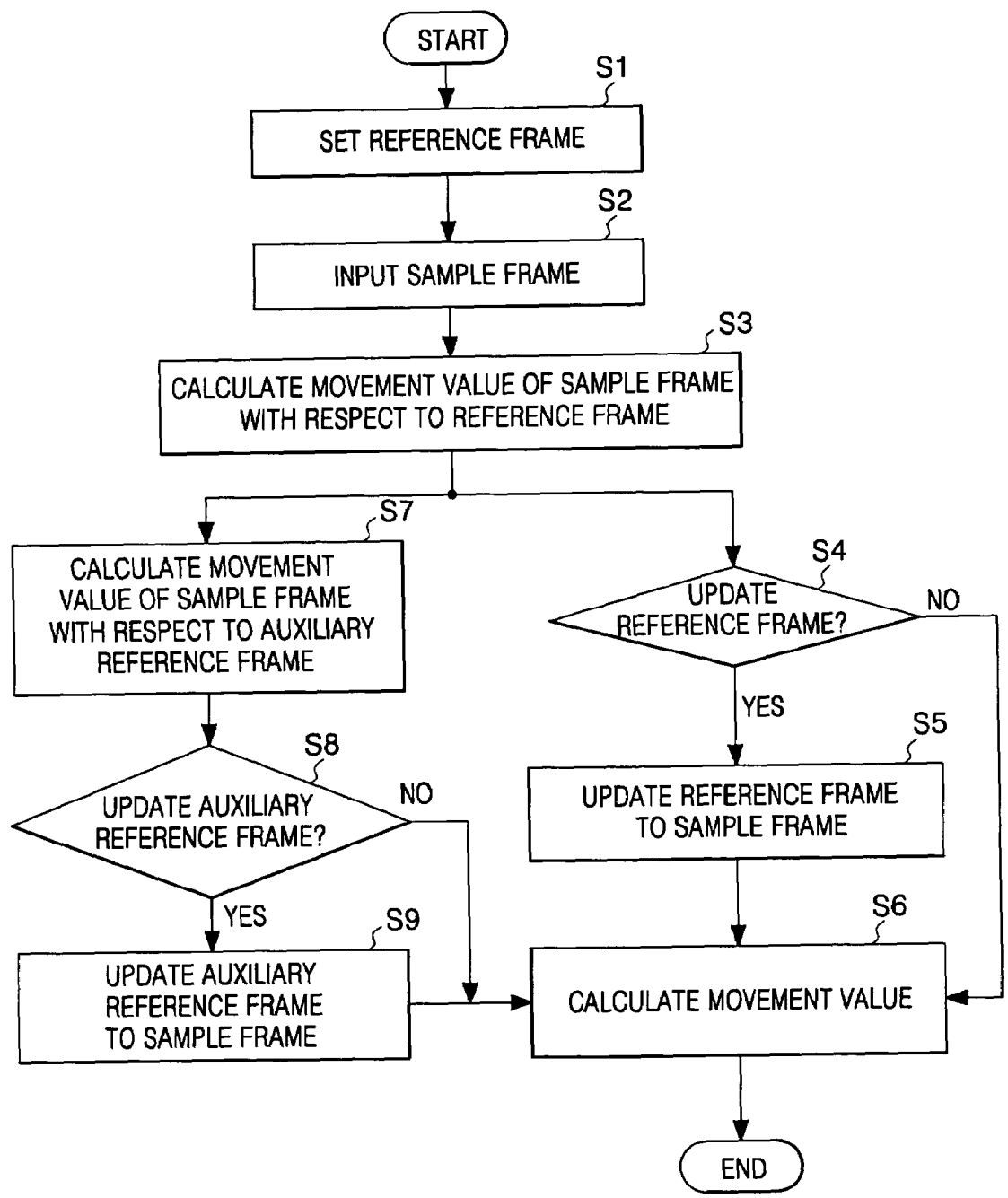
FIG. 4 is a diagram illustrating a method of calculating sub-pixel movement through a position tracking sensor of the present invention.

FIG. 4 is a diagram illustrating a method of calculating sub-pixel movement through a position tracking sensor in accordance with the present invention.

The position tracking sensor of the present invention has assumptions that one auxiliary reference frame is added, and that when the optical mouse moves at a distance of at least 3.0 pixels, the reference frame is updated, and that when the movement of the sample frame with respect to the reference frame is recognized, the auxiliary reference frame is updated.

Further, the criteria of the position tracking sensor updating the reference frame and the auxiliary reference frame can be arbitrarily adjusted by a developer or designer.

Either current image data gathered through a lens or the previous sample frame are set to the reference frame (S1).

The current image data gathered through the lens are inputted into the sample frame at each preset time interval (S2).

Correlation between the preset reference frame and the inputted sample frame is found to calculate the movement value of the optical mouse (S3).

It is checked whether the sample frame moves above 3.0 pixels with respect to the preset reference frame or not, and thereby it is determined whether the reference frame should be updated (S4).

As a result of the determination of S4, when the sample frame moves above 3 pixels with respect to the preset reference frame, the position tracking sensor updates the reference frame using a value of the sample frame (S5), and the movement value of the sample frame with respect to the reference frame, which is calculated in S3, is used to calculate the movement value of the optical mouse (S6).

Correlation between the auxiliary reference frame and the currently inputted sample frame is found to calculate the movement value of the optical mouse (S7).

It is checked whether the movement value of the sample frame with respect to the reference frame is checked or not, and thereby it is determined whether the auxiliary reference frame should be updated (S8).

As a result of the determination of S8, when the movement value of the sample frame with respect to the reference frame is recognized, if the auxiliary reference frame should be updated, the auxiliary reference frame is updated to the current sample frame (S9), and the movement value of the sample frame with respect to the calculated auxiliary reference frame is used to calculate the movement value of the optical mouse (S6).

As described above, in the method of calculating the sub-pixel movement through the position tracking sensor shown in FIG. 4, the movement of the sample frame with respect to the reference frame independently calculated with the movement of the sample frame with respect to the auxiliary reference frame. The movement value of the optical mouse is outputted based on these calculated values.

increased by 1 whenever the movement of the optical mouse is recognized until the reference fame is updated.

Under these assumptions, as described in Table 2, the movement of the optical mouse using the reference frame of the position tracking sensor of the present invention is first recognized when the sample frame moves above 0.5 pixel at the time when the reference frame is updated, and then is further recognized whenever the moving distance is increased by about 1.0 pixel.

In other words, when the number of the reference frame is one (1), it can be appreciated that the number of times recognizing the movement of the optical mouse is increased to 1, 2, 3, etc. as a movement distance of the optical mouse is increased to about 0.5 pixel, 1.5 pixels, 2.5 pixels, etc.

Therefore, the number of times recognizing the movement of the optical mouse using one reference frame is 1 at the time point of N+2 that the actual moving distance amounts to 0.8 pixel, and is 2 at the time point of N+4 that the actual moving distance amounts to 1.6 pixels.

The auxiliary reference frame of the present invention is updated at the time point of N+2 that the movement of the sample frame with respect to the reference frame is recognized to exceed 0.5 pixel, and at the time points of N+4 and N+7 that the movement of the sample frame with respect to the updated auxiliary reference frame is recognized to exceed 0.5 pixel.

Further, as to recognition of the movement of the optical mouse using the auxiliary reference frame of the position tracking sensor, the movement of the sample frame with respect to the auxiliary reference frame is recognized at the time point of N+4 that the actual moving distance of the optical mouse amounts to 1.6 pixels and at the time point of N+6 that the actual moving distance of the optical mouse

TABLE 2

| | Sample No. | | | | | | | | |
|---|---|---|---|---|---|---|---|---|---|
| | N | N + 1 | N + 2 | N + 3 | N + 4 | N + 5 | N + 6 | N + 7 | N + 8 |
| Actual moving distance (pixel) | 0.0 | 0.4 | 0.8 | 1.2 | 1.6 | 2.0 | 2.4 | 2.8 | 3.2 |
| Update of reference frame | Yes | — | — | — | — | — | — | Yes | — |
| Distance between reference frame and sample frame (pixel) | 0.0 | 0.4 | 0.8 | 1.2 | 1.6 | 2.0 | 2.4 | 2.8 | 3.2 |
| Recognition of movement of sample frame with respect to reference frame | — | — | Yes | — | Yes | — | — | Yes | — |
| Update of auxiliary reference frame | — | — | Yes | — | Yes | — | — | Yes | — |
| Distance between auxiliary reference frame and sample frame (pixel) | — | — | 0.0 | 0.4 | 0.0 | 0.4 | 0.8 | 0.0 | 0.4 |
| Recognition of movement of sample frame with respect to reference frame? | — | — | — | — | Yes | — | Yes | — | — |
| The number of times recognizing movement of optical mouse using only reference frame | 0 | 0 | 1 | 1 | 2 | 2 | 2 | 3 | 3 |
| The number of times recognizing movement of optical mouse using added auxiliary reference frame | 0 | 0 | 1 | 1 | 3 | 3 | 4 | 5 | 5 |

In the position tracking sensor shown in Table 2, it is assumed that one auxiliary reference frame is additionally set, and that an updating period of the reference frame is a time when the optical mouse moves above 3 pixels, and that an updating period of the auxiliary reference frame is a time when the movement of the sample frame with respect to the reference frame is recognized.

It is further assumed that the optical mouse has the actual moving distance increased by 0.4 pixel at a constant velocity whenever the position tracking sensor extracts an image, and has the accumulated number of times of recognition in such a manner that the movement value of the optical mouse is amounts to 2.4 pixels, because the distance between the updated auxiliary reference frame and the currently inputted reference frame reaches 0.8 pixel at each time point.

Therefore, the position tracking sensor of the present invention recognizes the movement of the sample frame with respect to the reference frame three times, i.e., at the time points of N+2, N+5 and N+7, and further recognizes the movement of the sample frame with respect to the auxiliary reference frame two times, i.e., at the time points of N+4 and N+6. Thus, the position tracking sensor recognizes the movement of the optical mouse five times in total.

When the position tracking sensor adding the auxiliary reference frame is used as described above, even after the movement of the optical mouse is first recognized, the movement of the optical mouse can be continuously recognized in unit of 0.5 pixel to which the movement of the sample frame with respect to the auxiliary reference frame amounts.

Therefore, when the movement value of the optical mouse that uses the position tracking sensor is outputted to the computer with ½ factor reduction, the movement accuracy of the optical mouse can be improved twice compared with the prior art.

As described above, according to the method of calculating sub-pixel movement and a position tracking sensor using the same, an auxiliary reference frame is added and used independently of a reference frame, a precise sub-pixel movement can be continuously recognized, and a value of the movement can be outputted, and the number of the auxiliary reference frames may be added at need of the developer.

Therefore, the method of calculating sub-pixel movement and the position tracking sensor using the same in accordance with the present invention can improve resolution to the movement, and significantly enhance performance of the optical mouse.

While the present invention has been described in connection with an exemplary embodiment, those skilled in the art will appreciate that a variety of modifications and changes can be made without departing from the spirit and scope of the present invention, claimed in the following appended claims.

What is claimed is:

1. A method of calculating sub-pixel movement through a position tracking sensor, comprising:
    setting a reference frame and receiving a current surface image illuminated by light as a sample frame;
    calculating a correlation between the reference frame and the sample frame to obtain a first movement value;
    updating the reference frame to the sample frame when the first movement value is above a first value, and outputting the first movement value and simultaneously updating an auxiliary reference frame to the sample frame when the first movement value is above a second value; and
    calculating a second movement value of the sample frame with respect to the auxiliary reference frame, and outputting the second movement value when the second movement value is above a third value;
    wherein the auxiliary reference frame has the same number of pixels as the reference frame, but a different frame update speed and a different condition for outputting a movement value from that of the reference frame.

2. The method according to claim 1, wherein:
    the first value is greater than the second value and the third value;
    the second value is smaller than the first value but larger than the third value; and
    wherein the third value is smaller than the first value and the second value and is above 0.5 pixels.

3. A position tracking sensor detecting movement through an image change of a surface illuminated by light, the position tracking sensor comprising:
    a reference frame and an auxiliary reference frame, the auxiliary reference frame having the same number of pixels as the reference frame but a different frame update speed and a different condition for outputting a movement value than those of the reference frame,
    wherein, when a sample frame is input, a value of movement of the sample frame with respect to the reference frame and a value of movement of the sample frame with respect to the auxiliary reference frame are independently calculated and outputted.

4. The position tracking sensor according to claim 3, wherein the reference frame is updated to the sample frame, when the sample frame moves above a first value with respect to the reference frame.

5. The position tracking sensor according to claim 4, wherein the first value is set at need.

6. The position tracking sensor according to claim 3, wherein the value of movement of the sample frame with respect to the reference frame is recognized when the sample frame moves above 0.5 pixel for the first time with respect to the reference frame, and then is recognized whenever the movement of the sample frame with respect to the reference frame is increased by 1.0 pixel.

7. The position tracking sensor according to claim 3, wherein the auxiliary reference frame has an updating time determined in connection with calculation of the movement of the sample frame with respect to the reference frame.

8. The position tracking sensor according to claim 3, wherein the value of movement of the sample frame with respect to the auxiliary reference frame is recognized whenever the sample frame moves above 0.5 pixel at the time point when the auxiliary reference frame is updated.

9. The position tracking sensor according to claim 6, wherein the auxiliary reference frame has an updating time determined in connection with calculation of the movement of the sample frame with respect to the reference frame.

* * * * *